(12) United States Patent
Uchiyama et al.

(10) Patent No.: US 6,760,020 B1
(45) Date of Patent: Jul. 6, 2004

(54) IMAGE PROCESSING APPARATUS FOR DISPLAYING THREE-DIMENSIONAL IMAGE

(75) Inventors: Shinji Uchiyama, Yokohama (JP); Hiroyuki Yamamoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/266,858

(22) Filed: Mar. 12, 1999

(30) Foreign Application Priority Data

Jun. 30, 1998 (JP) .......................................... 10-185135

(51) Int. Cl.⁷ .............................................. G06T 15/00
(52) U.S. Cl. ..................................... 345/419; 345/420
(58) Field of Search ................................ 345/419, 420, 345/191, 427, 563

(56) References Cited

U.S. PATENT DOCUMENTS

| | | | |
|---|---|---|---|
| 5,020,878 A | | 6/1991 | Brokenshire et al. |
| 5,581,271 A | * | 12/1996 | Kraemer .......................... 345/8 |
| 5,590,062 A | * | 12/1996 | Nagamitsu et al. ............. 703/6 |
| 5,796,373 A | * | 8/1998 | Ming-Yen ...................... 345/6 |
| 5,805,868 A | * | 9/1998 | Murphy ...................... 395/502 |
| 5,808,588 A | * | 9/1998 | Lin ................................ 345/6 |
| 5,841,409 A | * | 11/1998 | Ishibashi et al. ............... 345/8 |
| 5,910,817 A | * | 6/1999 | Ohashi et al. .............. 348/159 |
| 5,914,719 A | * | 6/1999 | Herz .......................... 345/418 |
| 5,923,627 A | * | 7/1999 | Miwa et al. ................... 369/47 |
| 6,057,840 A | * | 5/2000 | Durrani et al. ............. 345/341 |
| 6,072,443 A | * | 6/2000 | Nasserbakht et al. .......... 345/7 |
| 6,073,115 A | * | 6/2000 | Marshall ...................... 705/35 |
| 6,084,594 A | * | 7/2000 | Goto .......................... 345/427 |
| 6,154,600 A | * | 11/2000 | Newman et al. ................ 386/4 |
| 6,160,909 A | * | 12/2000 | Melen .......................... 382/154 |
| 6,188,406 B1 | * | 2/2001 | Fong et al. .................. 345/348 |
| 6,198,484 B1 | * | 3/2001 | Kameyama ................. 345/419 |
| 6,215,485 B1 | * | 4/2001 | Phillips ....................... 345/328 |
| 6,343,987 B2 | * | 2/2002 | Hayama et al. ................ 463/1 |

FOREIGN PATENT DOCUMENTS

| | | |
|---|---|---|
| EP | 0 817 125 | 1/1998 |
| EP | 0 827 350 | 3/1998 |
| GB | 2 176 671 | 12/1986 |
| JP | 2-280280 | 11/1990 |
| JP | 9-201472 | 8/1997 |
| JP | 10-154059 | 6/1998 |
| WO | 96/22660 | 7/1996 |

* cited by examiner

*Primary Examiner*—Mark Zimmerman
*Assistant Examiner*—Enrique L Santiago
(74) *Attorney, Agent, or Firm*—Fitzpatrick, Cella, Harper & Scinto

(57) ABSTRACT

A stereoscopic image processing apparatus which can automatically assign stereoscopic viewing parameters to VRML data in which no stereoscopic viewing parameters are defined. VRML data is input, and the user sets or changes stereoscopic viewing parameters (initial values of the base line length and convergence angle) required for stereoscopic viewing on the basis of the input VRML data.

The initial value of the base line length is set based on the maximum size of the range of the space of the VRML data, and the initial value of the convergence angle is set at "0". These initial values are arbitrarily changed at a user interface.

14 Claims, 18 Drawing Sheets

FIG. 9
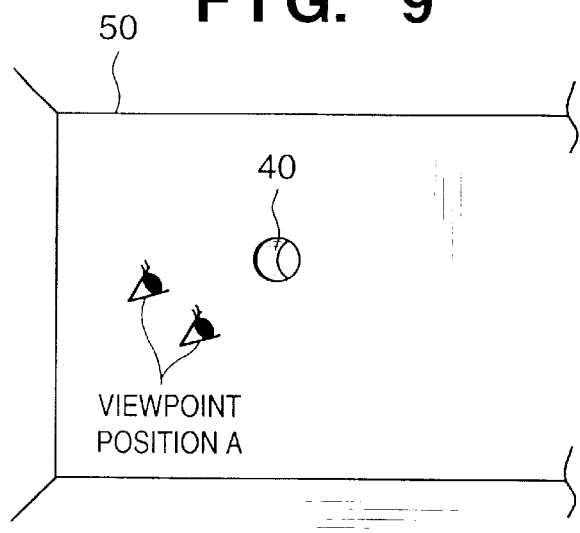
FIG. 10
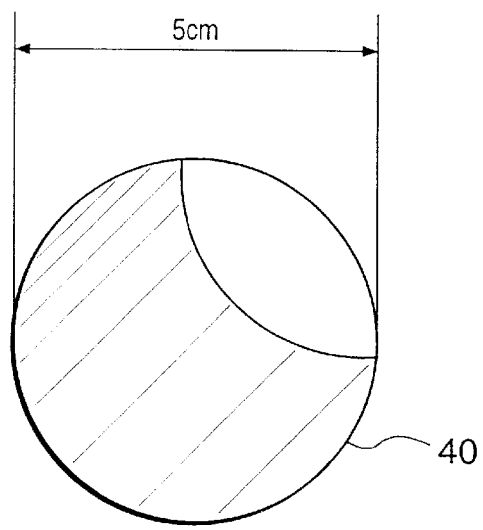
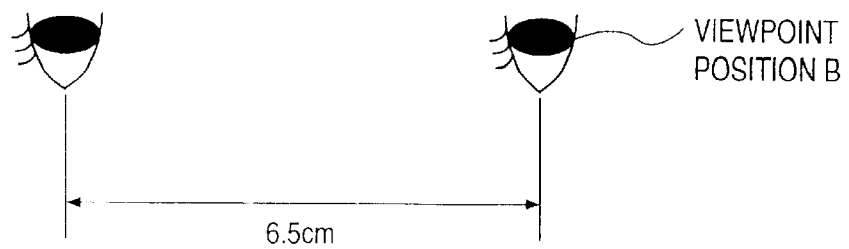

F I G. 14
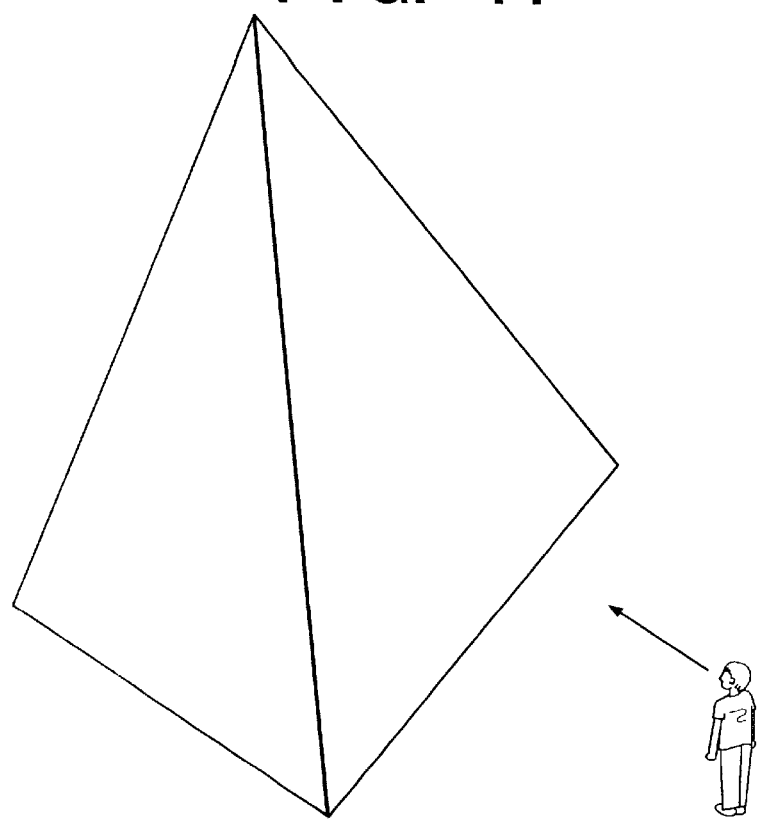
F I G. 15
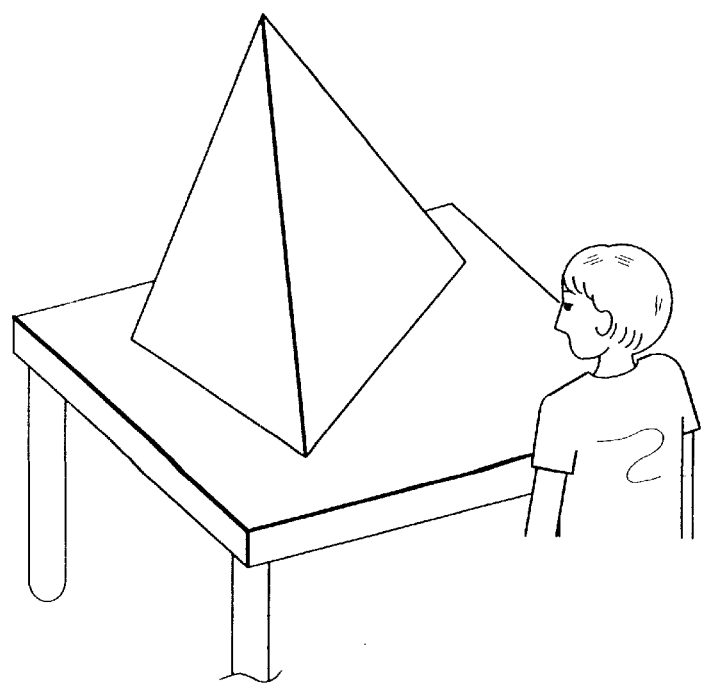

FIG. 20

| |
|---|
| 00000000000000 |
| 11111111111111 |
| 00000000000000 |
| 11111111111111 |
| 00000000000000 |
| 11111111111111 |
| 00000000000000 |
| 11111111111111 |
| 00000000000000 |
| ⋮ |
| 00000000000000 |
| 11111111111111 |
| 00000000000000 |
| 11111111111111 |

IMAGE PROCESSING APPARATUS FOR DISPLAYING THREE-DIMENSIONAL IMAGE

BACKGROUND OF THE INVENTION

The present invention relates to an image processing apparatus for converting space data described in a language or format that processes a three-dimensional virtual space such as a VRML (Virtual Reality Modeling Language) or the like, into image data that can be stereoscopically observed, and to a viewer apparatus for displaying such image data.

The present invention also relates to a user interface apparatus for changing stereoscopic viewing parameters, a stereoscopic display buffer control method and apparatus for obtaining stereoscopic viewing, and a program storage medium for storing their programs.

As the performance of computers has improved in recent years, three-dimensional computer graphics (CG) has increasingly prevailed. In addition, along with rapid spread of WWWs (World Wide Webs) on the Internet, a VRML as a language that processes a three-dimensional space on the WWW has been standardized, and has been prevalently used.

The VRML 2.0 as the currently available latest version is used for building a virtual mall for electric commerce, managing three-dimensional data of, e.g., CAD in an intranet, and so forth.

On the other hand, the assignee of the present invention has developed a rear-cross lenticular 3D display (to be referred to as a stereoscopic display apparatus hereinafter to be distinguished from a two-dimensional display apparatus) as a stereoscopic display apparatus that allows the observer to directly perceive depth. In addition to this display apparatus, many stereoscopic display apparatuses have been proposed.

In order to display a three-dimensional space described in the VRML 2.0, a VRML viewer apparatus is required. However, a normally prevalent VRML viewer apparatus can only make two-dimensional display (to be referred to as a "two-dimensional display apparatus hereinafter in contrast to the "stereoscopic display apparatus") as final display using a normal monitor, although a three-dimensional space is described.

This is because some parameters (to be referred to as "stereoscopic viewing parameters" hereinafter) for attaining stereoscopic viewing are not supported by the VRML 2.0.

In other words, there is no conventional stereoscopic display apparatus that can efficiently change the "stereoscopic viewing parameters" in utilizing space data described in the language or format such as VRML that cannot describe the stereoscopic viewing parameters. This is the first problem the conventional stereoscopic display apparatus suffers.

In order to realize stereoscopic viewing on a display, for example, in, e.g., the rear-cross lenticular 3D display proposed by the assignee, right and left images must be alternately written in one frame buffer stripe by stripe.

The problem in the conventional buffer control method will be explained below using the flow chart in FIG. 18.

Conventionally, as shown in the control sequence in FIG. 18, an image to be seen when the three-dimensional space is viewed by the right eye is generated, and three-dimensional space data is rendered on the basis of the viewpoint position and gaze direction of the right eye in step S50. With this process, a right eye image as a rendering result is stored in frame buffer A.

In step S52, an image to be seen when the three-dimensional space is viewed by the left eye is generated, and three-dimensional space data is rendered on the basis of the viewpoint position and gaze direction of the left eye. As a result, a left eye image as a rendering result is stored in frame buffer B.

In step S54, frame buffer C is prepared, and data required for right eye display is read out from the contents of frame buffer A and is written in frame buffer C.

In step S56, data required for left eye display is read out from the contents of frame buffer B and is written in frame buffer C. In this manner, the buffer control method shown in FIG. 18 requires three buffers.

FIG. 19 shows a buffer write control sequence according to another prior art. The buffer control method shown in FIG. 19 requires two buffers.

In this fashion, both the methods shown in FIGS. 18 and 19 require two or more frame buffers, and are disadvantageous in cost.

Also, inter-buffer data transfer that requires processing for reading out data from a frame buffer in which the data has been written, and writing the data in another frame buffer is time-consuming processing, and lowers the processing speed.

SUMMARY OF THE INVENTION

The present invention has been made in consideration of the conventional problems, and has as its object to provide a stereoscopic image processing apparatus, user interface apparatus, and stereoscopic image display apparatus, which can assign parameters to three-dimensional space data in which stereoscopic viewing parameters are not defined.

It is another object of the present invention to provide a user interface apparatus which can freely change the stereoscopic viewing parameters.

It is still another object of the present invention to provide a buffer control apparatus and method, which requires only one frame buffer, and can obviate the need for reading out any data from that frame buffer.

In order to achieve the above object, a stereoscopic image processing apparatus according to the present invention comprises:

means for receiving and storing three-dimensional space data; and means for generating a parameter required for stereoscopic viewing on the basis of the received three-dimensional space data.

According to a preferred aspect of the present invention, the parameter defines a base line length of a user. Also, according to a preferred aspect of the present invention, the parameter defines a convergence angle of a user. The base line length and convergence angle are mandatory parameters required to realize stereoscopic viewing.

Since the user often does not know that an input three-dimensional space data requires parameter setup, it is preferable to automatically set parameters. Hence, according to a preferred aspect of the present invention, the apparatus further comprises means for determining necessity of generation of the parameter on the basis of a file extension of the received three-dimensional space data or attribute information appended the data file.

According to the present invention, a user interface apparatus used upon displaying a stereoscopic image, comprises:

user setting means for allowing a user to set a value of a stereoscopic viewing parameter; and means for changing a value of the stereoscopic viewing parameter in accordance with the set value.

With this user interface apparatus, the parameters can be freely changed to match image data with the purpose of the user's application.

The user interface is preferably displayed on the display screen. According to a preferred aspect of the present invention, the apparatus further comprises display means, and the user setting means displays a GUI on the display means.

According to a preferred aspect of the present invention, the GUI is implemented by a slide bar, jog dial or wheel.

A buffer control method for effectively using a buffer according to the present invention is directed to a buffer control method upon obtaining stereoscopic viewing by displaying right and left eye images written in one frame buffer, comprising the steps of:

preparing mask information that defines a mask function in advance;

writing one of the right and left eye images in the frame buffer; and overwriting the other image on the frame buffer with reference to the mask information. Upon overwrite, a portion of one image is left and a portion of the other image is overwritten on the frame buffer in accordance with the mask function of the mask information.

The above objects are also achieved by a buffer control apparatus which has one frame buffer and obtains stereoscopic viewing by displaying right and left eye images written in the frame buffer, comprising:

a mask memory written with mask information that defines a mask function in advance; and control means for writing one of the right and left eye images in the frame buffer, and then overwriting the other image on the frame buffer with reference to the mask information in the mask memory.

In this case, according to a preferred aspect of the present invention, the mask memory comprises a stencil buffer.

In the control method according to a preferred aspect of the present invention, the mask function is determined based on an order of stripes on a display apparatus, and a write order of images in the frame buffer.

In the control method according to a preferred aspect of the present invention, the mask information is written in a stencil buffer at least before the other image is written in the frame memory.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a view for explaining the necessity of appropriately setting the base line length;

FIG. 10 is a view for explaining the necessity of appropriately setting the base line length;

FIG. 14 shows a display example of a virtual space when a small base line length is set;

FIG. 15 shows a display example of a virtual space when a large base line length is set;

FIG. 20 is a view for explaining an example of mask information stored in a stencil buffer 12;

DETAILED DESCRIPTION OF THE INVENTION

An embodiment in which the present invention is applied to a stereoscopic display apparatus (to be referred to as a "VRML viewer apparatus" hereinafter) for receiving and stereoscopically displaying three-dimensional space data described with the VRML 2.0 using a WWW browser will be described below. This stereoscopic display apparatus uses as a display a rear-cross lenticular 3D display developed by the present applicant so as to give a stereoscopic sense to the user. However, as can be seen from the following description, the present invention cannot be applied to only virtual space data in the VRML 2.0, only virtual space data received by a WWW browser, or only the rear-cross lenticular 3D display.

<System Arrangement>

Figure 1:
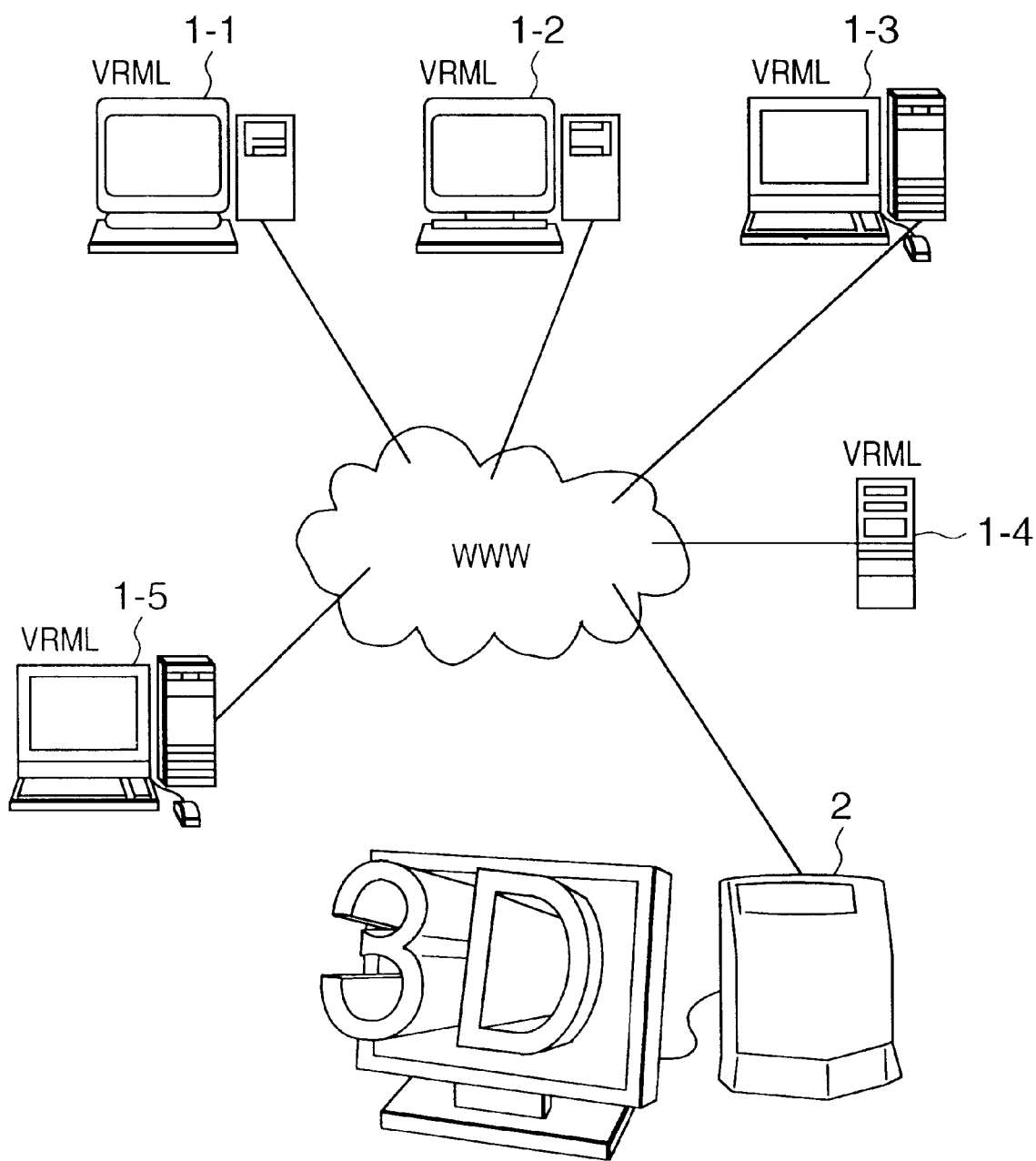
FIG. 1 is a view for explaining a WWW network to which viewer apparatuses according to an embodiment are connected.

FIG. 1 shows a WWW network to which a plurality of VRML viewer apparatuses that adopt the method of the present invention are connected. The features of the VRML viewer apparatus of this embodiment are:

i: the apparatus has a function of assigning a base line length and convergence angle to VRML data which is downloaded or transferred from a server (1-1, 1-2, 1-3, 1-4, 1-5) at a remote WWW site to a terminal system 2;

ii: the user of this viewer apparatus can change the values of the base line length and convergence angle in VRML data to which initial values of the base line length and convergence angle have been assigned; and iii: a stereoscopic image can be rendered at high speed by effectively using a stencil buffer.

Figure 2:
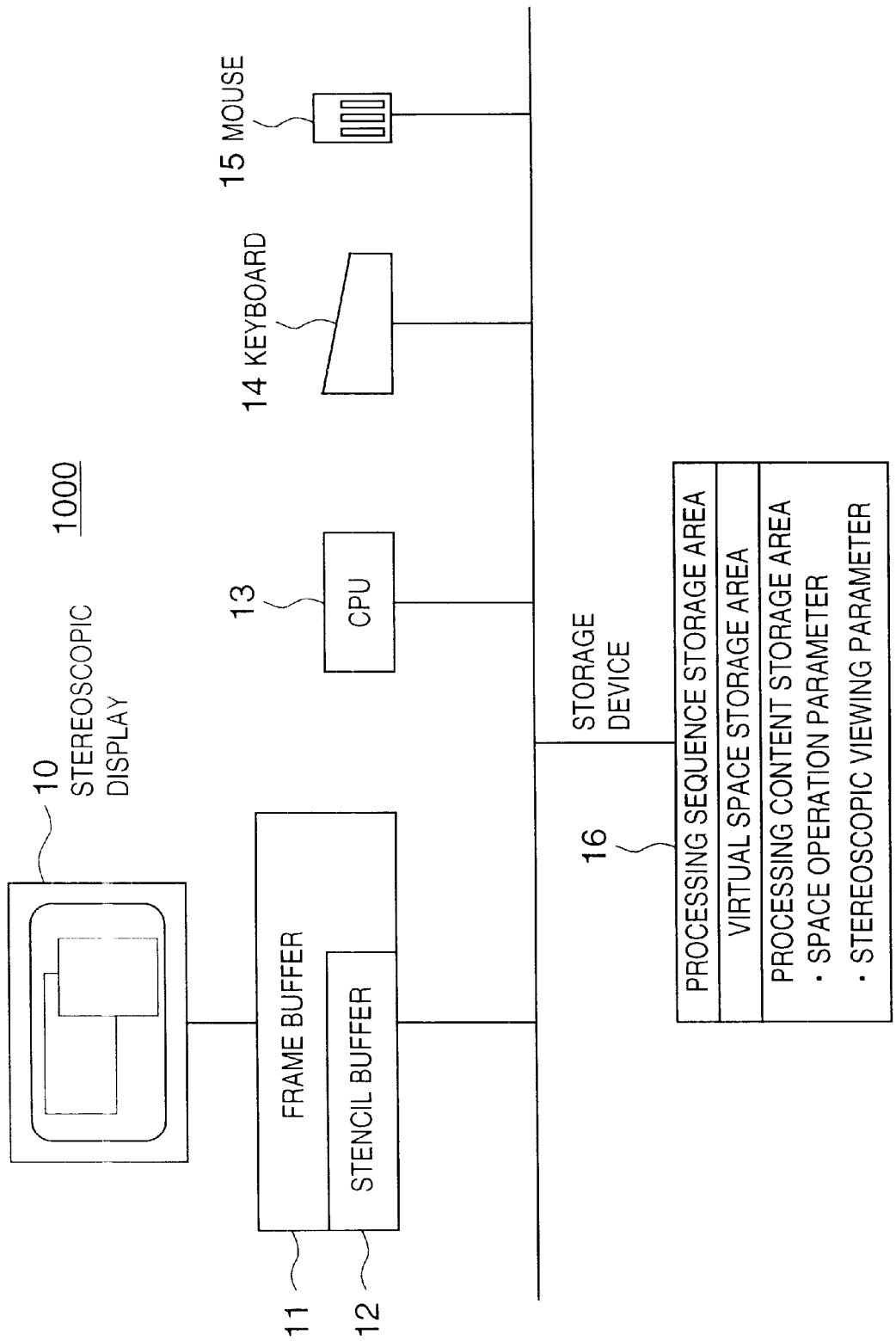
FIG. 2 is a block diagram showing the arrangement of a viewer apparatus 1000 according to an embodiment.

FIG. 2 shows the hardware arrangement of a viewer apparatus 1000 of this embodiment. The viewer apparatus 1000 has a display 10, a frame buffer 11 for temporarily storing data to be displayed on the display 10, a stencil buffer 12 for storing mask information, a CPU 13, a keyboard 14, a mouse 15, and a storage device 16 like in a normal workstation or personal computers.

The display 10 uses a rear-cross lenticular eye-glass-less (i.e., naked eye) 3D display proposed by the present application to attain stereoscopic viewing.

Figure 3:
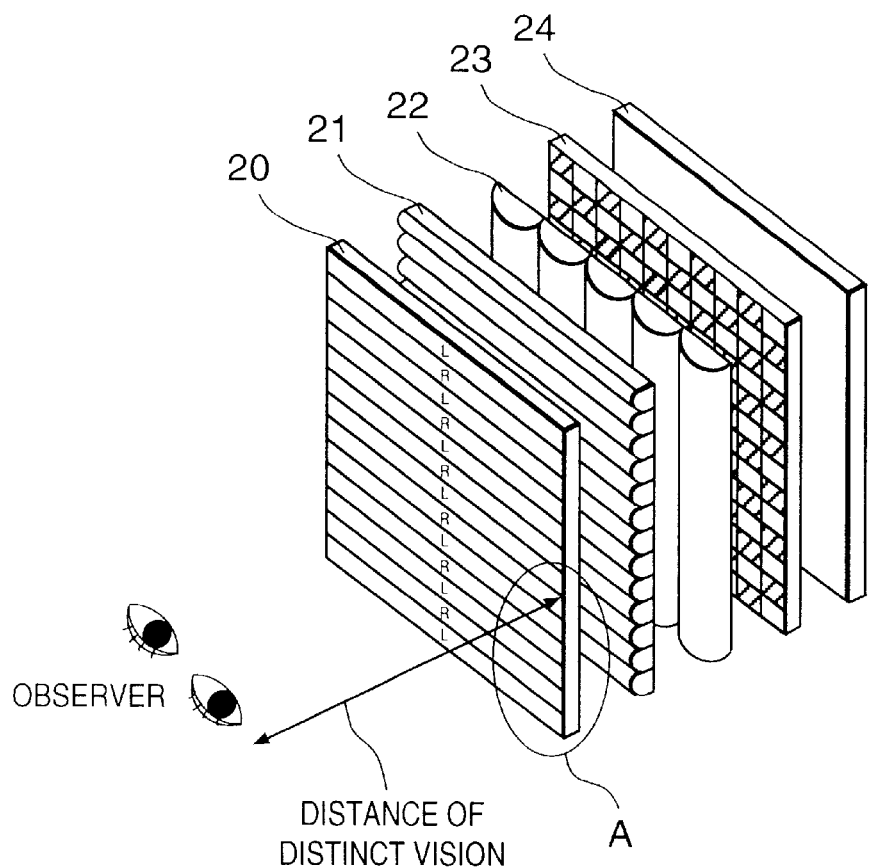
FIG. 3 is a perspective view for explaining the arrangement of a rear-cross lenticular spectacle or 3D display 10 used in the viewer apparatus 1000.

As shown in FIG. 3, the rear-cross lenticular eye-glass-free 3D display 10 is characterized by inserting two lenticular lenses (an H lenticular lens 21 and V lenticular lens 22) and a checkerboard-like mask panel 23 between a TFT liquid crystal (LC) panel 20 and backlight panel 24. The V lenticular lens 22 has a role of splitting illumination light coming from the backlight panel 24 in the right and left eye directions by changing its directionality in units of scanning lines. The H lenticular lens 21 prevents crosstalk by focusing light coming from an aperture of one horizontal line of the checkerboard-like mask panel 23 onto one scanning line of the LC panel 20, and broadens the stereoscopic viewing range in the vertical direction by converting light coming from the aperture portion into divergent light toward the observer.

Figure 4:
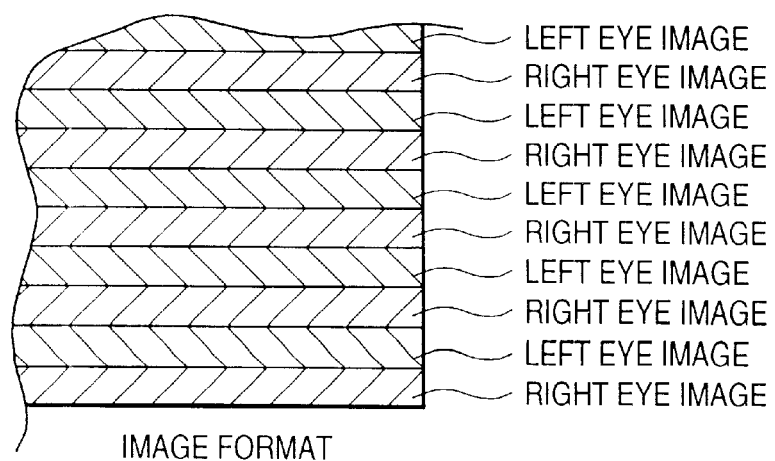
FIG. 4 is an enlarged view of an LCD portion of the display 10.

FIG. 4 is an enlarged view of a partial region A of the LC panel 20 shown in FIG. 3. As shown in FIG. 4, an image obtained by synthesizing pairs of right and left stereo images for stereoscopic viewing, which are alternately arranged in horizontal stripe patterns, is displayed on the LC panel 20. For this reason, the following merits are expected: no color separation of the liquid crystal corresponding to vertical stripes takes place as compared to a normal lenticular scheme that receives vertical stripe images, the display 10 is compatible with a horizontal stripe synthesized image of a time-division field sequential scheme normally used in liquid crystal shutter spectacles or the like, and so forth.

<Rendering for Stereoscopic Viewing>

Figure 5:
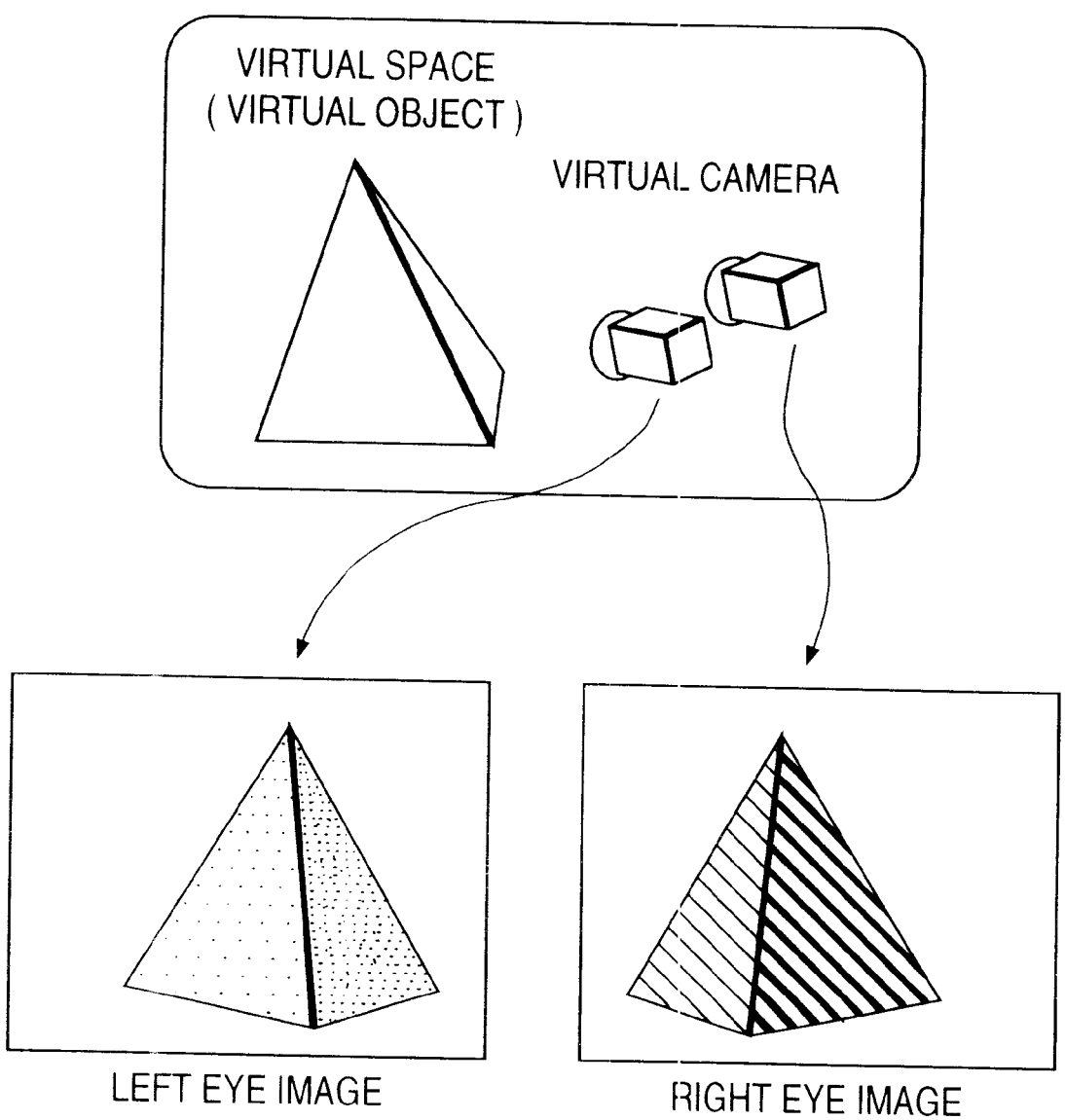
FIG. 5 is a view for explaining the principle of generation of right and left eye images for obtaining stereoscopic viewing.

Images of a virtual space constructed using three-dimensional geometric data such as VRML data or the like viewed from two viewpoints corresponding to the right and left eyes can be rendered using a conventional CG technique while considering these two viewpoints as virtual cameras, as shown in FIG. 5. In this case, data that pertain to the viewpoint positions (R, L), gaze direction (vector e), base line length b, and convergence angle θ of the right and left eyes of the user are required.

Figure 6:
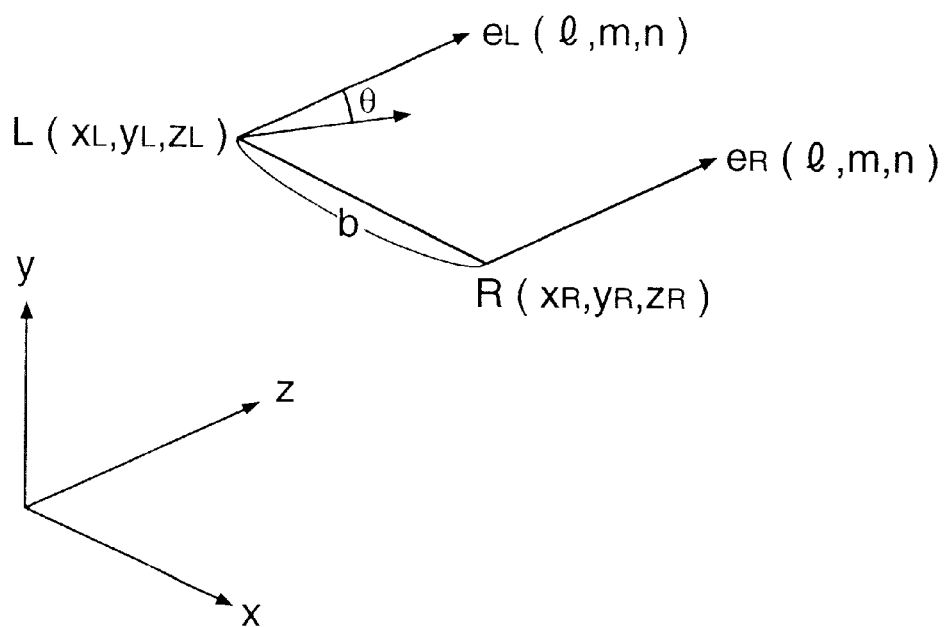
FIG. 6 is a view for explaining the relationship between the convergence angle and base line length.

Assume that the viewpoint positions (R, L), gaze direction (line of sight vector e), base line length b, and convergence angle θ are given. FIG. 6 shows the relationship among the viewpoint positions (R, L), gaze direction (line of sight vector e), base line length b, and convergence angle θ when a description method that defines the right eye of a dextrocular user as the base line position is used. More specifically, if the camera coordinate system is represented by (x, y, z), its x-axis agrees with a direction from the left eye to the right eye, the z-axis agrees with the depth direction, and the y-axis agrees with the gaze direction e, the viewpoint positions R and L of the right and left eyes are respectively given by:

$$R(x_R, y_R, z_R) = (0, 0, 0)$$

$$L(x_L, y_L, z_L) = (x_R - b, y_R, z_R)$$

If (l, m, n) represents the gaze direction vector $e_R$ of the right eye, the gaze direction vector $e_L$ of the right eye is also expressed by (l, m, n). According to the description of FIG. 6, the vector that expresses the convergence angle can be expressed as a vector which has rotated an angle θ from a line of sight vector $e_L$ of the left eye.

Figure 7:
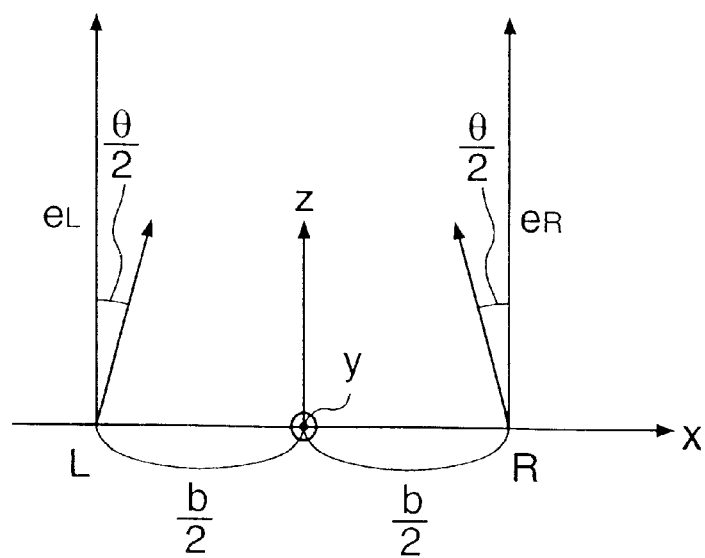
FIG. 7 is a view for explaining the relationship between the convergence angle and base line length by another description method.
Figure 8:
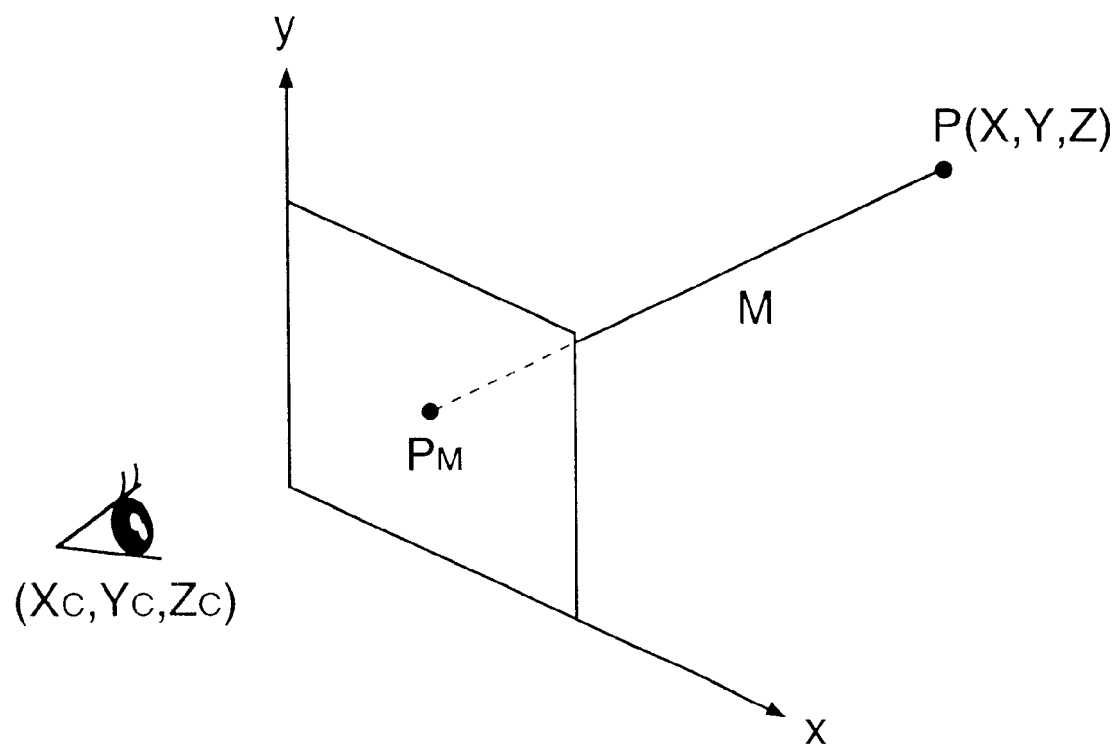
FIG. 8 is a view for explaining the principle of projecting an arbitrary three-dimensional position onto the imaging plane of a virtual camera.

FIG. 7 explains the description method of the base line length b and convergence angle θ when the center of the base line is set at the center between the right and left eyes. In this case, the coordinate origin is set at the center between the right and left eyes, the x-axis agrees with the direction from the left eye to the right eye, the y-axis agrees with the vertical direction, and the z-axis agrees with the depth direction. Then, the right eye is located at a position offset by b/2 to the right, and the left eye is located at a position offset by b/2 to the left. If θ represents the convergence angle, the right line of sight agrees with a direction that has rotated θ/2 counterclockwise from the line of sight vector $e_R$, and the left line of sight agrees with a direction that has rotated θ/2 clockwise from the line of sight vector $e_L$.

When the viewpoint positions (R, L), gaze direction (line of sight vector e), base length b, and convergence angle θ are given, in order to generate right and left images using two virtual cameras, as shown in FIG. 5, a projection M of a virtual camera placed at the position of an eye (right or left eye) onto a two-dimensional imaging plane (x, y) is obtained. If ($X_C$, $Y_C$, $Z_C$) represents the position of the virtual camera, the projection M is expressed by a matrix determined by the viewpoint position ($X_C$, $Y_C$, $Z_C$), the line of sight direction e, and the field angle, and perspective transformation can be normally used.

Three-dimensional space data such as VRML data or the like contain data that describes a shape (three-dimensional position data associated with point groups and patch links among points). If P(X, Y, Z) represents the position of a given point P in the three-dimensional space, a projection of that point P(X, Y, Z) onto the imaging plane of the virtual camera is normally expressed by the following homogeneous coordinate transformation:

$$\begin{pmatrix} x_M \\ y_M \\ z_M \\ W \end{pmatrix} = M \begin{pmatrix} X \\ Y \\ Z \\ 1 \end{pmatrix} \quad (1)$$

where M is a 4×4 matrix. Note that ($x_M$, $y_M$) represents a two-dimensional coordinate position on the imaging plane, and $Z_M$ corresponds to the depth after perspective transformation and can be used upon determining the object depth ordering in the depth direction. If equation (1) is calculated for all point groups, an image for the right or left eye is obtained. If one image (e.g., right eye image) is obtained, the matrix is changed to that for the other eye (e.g., ($X_C$, $Y_C$, $Z_C$)=($X_R$, $Y_R$, $Z_R$) and the line of sight direction $e_R$), and equation (1) is calculated again.

The scheme for generating the right and left eye images for stereoscopic viewing has been explained. This scheme itself is known to those who are skilled in the art. Also, a scheme that does not use any matrix calculation is available. However, in the stereoscopic image display apparatus of the present invention, the rendering scheme itself is not limited to any specific one.

<VRML Data>

Of VRML data, a portion that describes a space is composed of:

data that describes a shape (three-dimensional position data associated with point groups);

data that describes the surface characteristics (color, material and texture); and data that describes the light source position like in other three-dimensional space data. VRML data can also describe initial values, several sets of viewpoint positions and gaze directions, a method of operating a dynamically moving object, a method of generating sound, a script language that can execute a procedure, such that sound is generated if a given object is touched. Of these contents, those except for the viewpoint positions and gaze directions are not directly related to the present invention, and a detailed description thereof will be omitted.

However, in data defined by VRML, the "viewpoint position" and "gaze direction" of the user can be described, but neither data of the "base line length" nor "convergence angle" are assigned. It is not always necessary to describe "viewpoint position" and "gaze direction". This is because the "viewpoint position" and "gaze direction" need not be assigned at the time of generation of VRML data since they are used at the time of rendering a virtual space in practice so as to allow the user to freely move his or her viewpoint in the virtual space. The same applies even when VRML data is to be two-dimensionally or stereoscopically displayed and, hence, the "viewpoint position" and "gaze direction" of the user are not mandatory for VRML data.

Upon rendering VRML data, the "base line length" and "convergence angle" of the user can be arbitrary to a certain extent. The size of a space expressed by VRML data need not be expressed with reference to the size of a human, but can be freely set according to the will of the data creator. Hence, in the VRML data, it is nonsense to define the "base line length" and "convergence angle" with respect to actual size of the person who wants to experience the virtual space. For example, when a molecular structure model is rendered in the virtual space, the size of a molecule is very different from the base line length, and it is essentially nonsense to define the "base line length" in accordance with the size of a human.

The present inventor found that the extent that the "base line length" and "convergence angle" of the user can be arbitrary is not so greater than the "viewpoint position" and "gaze direction". That is, the "viewpoint position" and "gaze direction" of the user are mandatory when VRML data is displayed on a two-dimensional image or a stereoscopic viewing image is to be rendered. However, the "base line length" and "convergence angle" are not required when only one two-dimensional image is generated. On the other hand, in order to present stereoscopic viewing to the user, the "base line length" and "convergence angle" are required. For example, upon zooming from a macro world to a micro world (e.g., upon rendering a scene the observer who is looking into a small hole in a broad room enters that small hole), when a two-dimensional image is rendered, the "base line length" and "convergence angle" are not in question, but the moving speed alone is in question.

On the other hand, assume that in a room 50 with a small home 40, as shown in FIG. 9, the observer approaches the "hole" from a position separated from that hole, and enters the hole, while experiencing three-dimensional stereoscopic display. When the viewpoint position is considerably separated from the hole 40, the right and left eye images have no differences, and no problem is posed. However, when the observer comes close to the hole 40, if the base line length (the distance between the right and left eyes of a person is 6.5 cm) is larger than the diameter (5 cm in the example in FIG. 10) of that hole, as shown in FIG. 10, and the user wants to look into that hole, stereoscopic viewing rendering loses its meaning. That is, in the example in FIG. 10, since the base line length is larger than the diameter of that hole, the left eye cannot look into the hole 40. Two-dimensional image rendering does not suffer such problem. In case of the example shown in FIG. 10, if a user interface that allows the user to shorten the base line length is given, a stereoscopic image as if the user were entering the hole (that is, the user himself or herself were miniaturized) and were looking the interior of the hole can be rendered.

<Automatic Assignment of Base Line Length and Convergence Angle>

The viewer apparatus of this embodiment automatically assigns a base line length and convergence angle to externally received VRML data without the intervention of the user, in consideration of the fact that the VRML data is not assigned any base line length and convergence angle.

Figure 11:
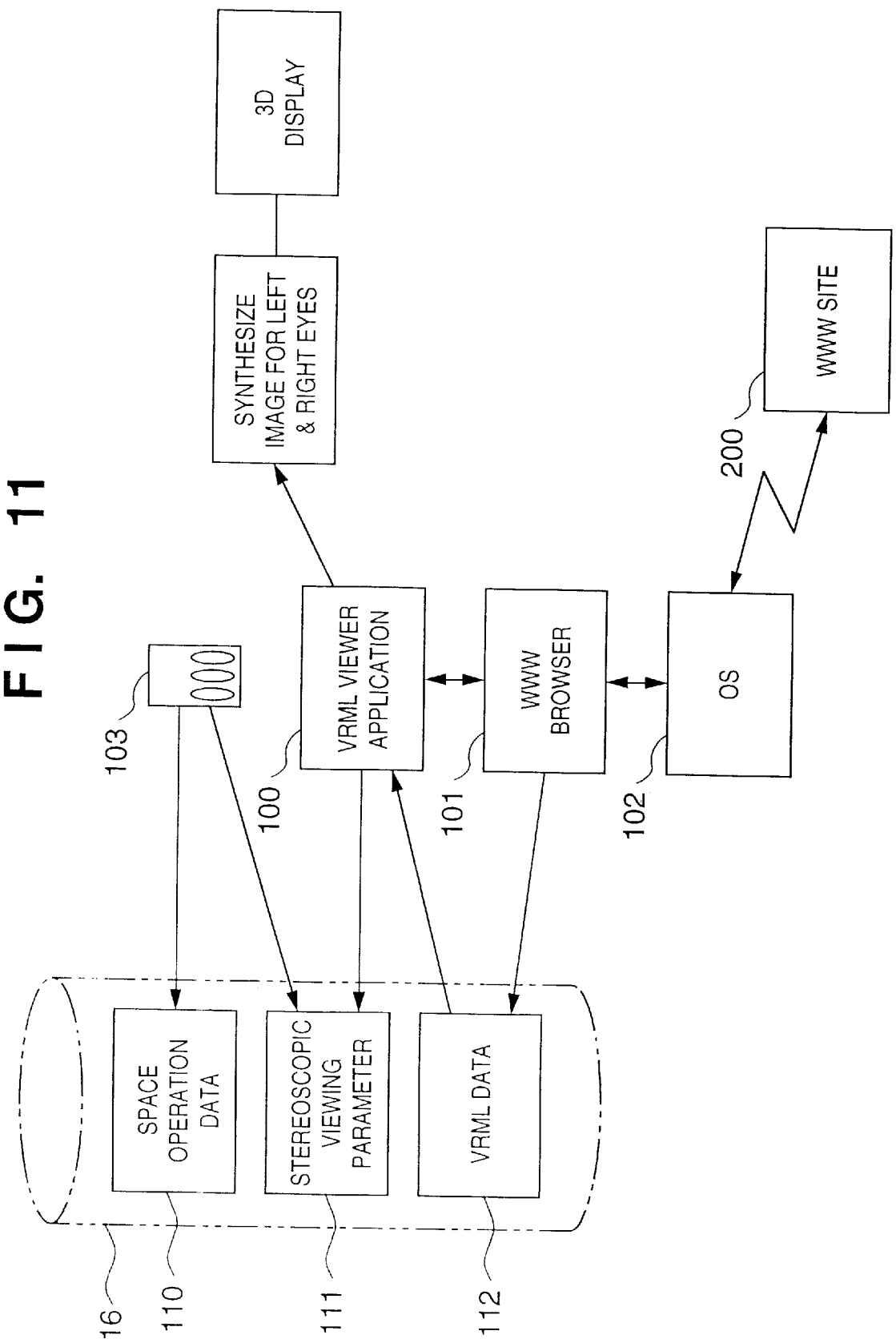
FIG. 11 is a block diagram for explaining the functional arrangement in the viewer apparatus 1000.

FIG. 11 explains the data flow when the viewer apparatus shown in FIG. 2 acquires VRML data from a WWW site via a WWW browser, assigns a base line length and convergence angle to that VRML data, generates right and left eye images 105 and 104 at an arbitrary viewpoint position, and displays the generated images on the stereoscopic display 10.

More specifically, referring to FIG. 11, a viewer application program 100 is a helper application program of a WWW browser 101 that runs under the control of an operating system (OS) 102. The viewer apparatus 1000 of this embodiment has the storage device 16 for storing the processing sequence (FIG. 12) of the viewer application program 100, virtual space data (three-dimensional space data), and processing contents (space operation parameters and stereoscopic viewing parameters), as shown in FIG. 2. The virtual space data (i.e., three-dimensional space data) shown in FIG. 2 corresponds to VRML data shown in FIG. 11. Also, the space operation data shown in FIG. 2 includes data which are required upon making stereoscopic viewing display in practice, and are input from a predetermined user interface to express the forward speed (or backward speed), field angle, and the like, and is denoted by 110 in FIG. 11. The stereoscopic viewing parameters in FIG. 2 are those generated by the viewer application program 100 such as the base line length, convergence angle, and the like, and are denoted by 111 in FIG. 11.

In FIG. 11, the user starts the WWW browser 101, which acquires VRML data from a WWW site 200. Three-dimensional data described by VRML is appended a predetermined file extension.

On the other hand, the viewer application program 100 is registered in advance as a helper application program of the WWW browser 101. More specifically, the viewer application program 100 assigns an initial value $b_0$ of the base line length and an initial value $\theta_0$ of the convergence angle to three-dimensional space data with the predetermined file extension passed from the WWW browser 101, and provides a user interface environment for changing space operation data including the base line length b, convergence angle $\theta$, and the like.

Figure 12:
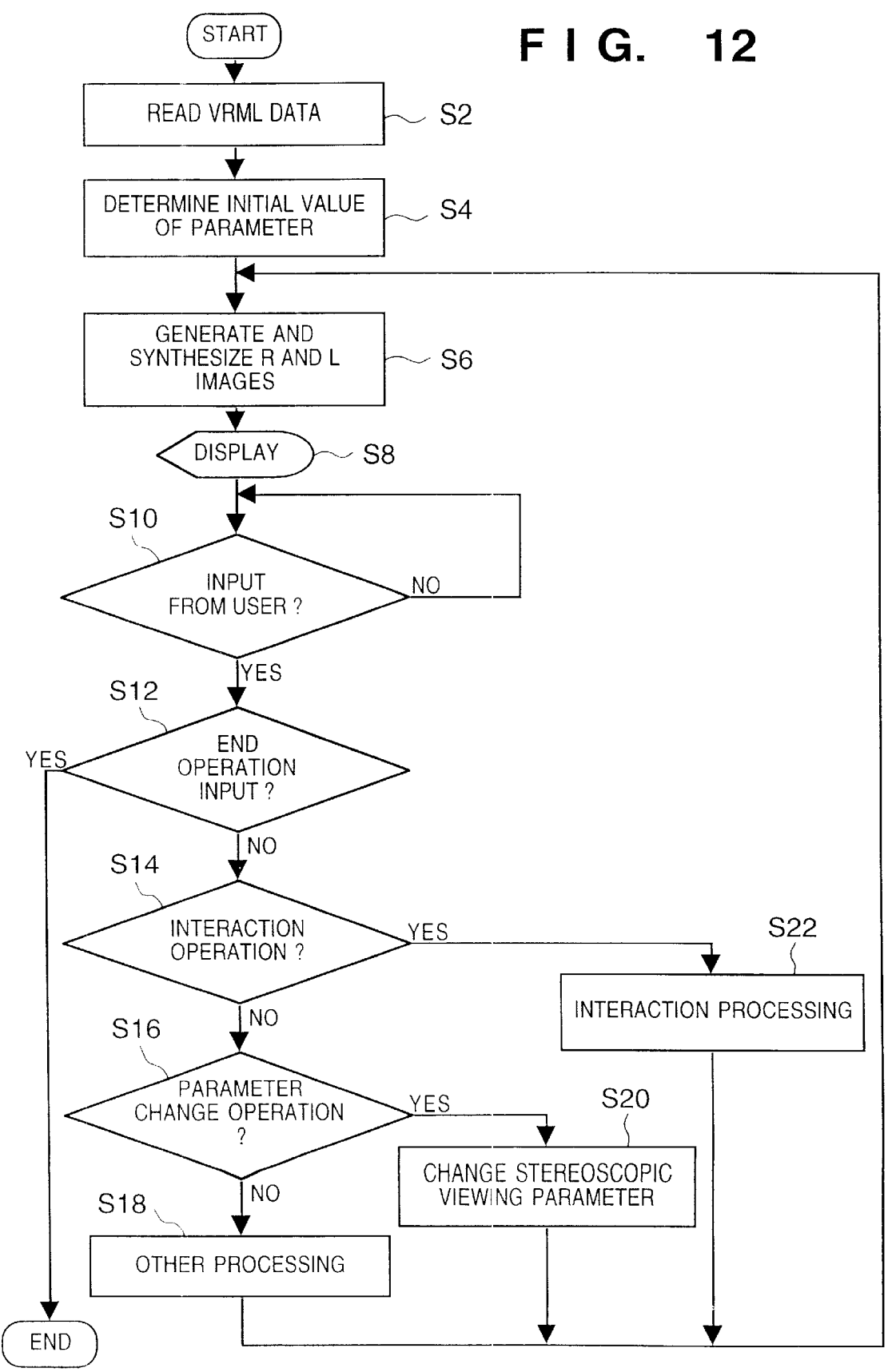
FIG. 12 is a flow chart showing the control sequence of a viewer application program.

The following explanation will be given with the aid of FIGS. 11 and 12. FIG. 12 shows the control sequence of the viewer application program 100.

When the WWW browser 101 detects that data received from the WWW site 200 has a file extension, it passes that VRML data to the viewer application program 100. The viewer application program 100 receives the VRML data in step S2.

In step S4, initial values ($b_0$ and $\theta_0$) of the stereoscopic viewing parameters (base line length b and convergence angle $\theta$) are determined from the received VRML data. This determination scheme will be explained later. The determined initial values are stored in a stereoscopic viewing parameter storage area 111.

In step S6, the right and left eye images 105 and 104 are generated using equation (1) above in accordance with the determined initial values ($b_0$ and $\theta_0$) of the base line length and convergence angle, and are passed to the WWW browser 101. The WWW browser 101 or operating system 102 synthesizes these images and displays the synthesized image on the display 10 (step S8). This synthesis scheme uses the stencil buffer 12, and is one of the characteristic features of the viewer apparatus 1000 of this embodiment, as will be described in detail later.

The user who observes the display screen may change the base line length, field angle, or convergence angle, or may make walkthrough operation such as forward or backward movement, rotation, or the like. The operation for changing the base line length, or convergence angle is called stereoscopic viewing parameter changing operation in this embodiment. On the other hand, the walkthrough operation such as changing in field angle, forward or backward movement, rotation, or the like is called interaction operation.

If it is determined that data input in step S10 indicates end of operation (step S12), the viewer application program 100 ends.

On the other hand, if it is determined that the input data indicates an interaction operation such as walkthrough, movement of an object in the virtual world, or the like, the flow advances to step S22 to execute processing corresponding to that interaction operation.

Also, if it is determined that the input operation is a stereoscopic viewing parameter operation, a stereoscopic viewing parameter associated with the operation is changed, i.e., the contents in the storage area 111 are changed in step S20.

<Initial Value of Base Line Length>

Of the processes executed in step S4, the initial value $b_0$ of the base line length is determined as follows.

More specifically, the viewer application program estimates the initial value $b_0$ of the base line length from only target space data. Note that the processing itself for obtaining stereoscopic viewing parameters from only space data which is not assigned any stereoscopic viewing parameters is not done conventionally.

The size of the entire space is estimated, and the product of this estimated size and an appropriate constant k is calculated to obtain the base line length initial value $b_0$. Such determination process means that "a size obtained by multiplying the size of the entire space by a given constant larger than 0 is defined as the size of a human" (the base line length of a standard person is 65 mm).

Figure 13:
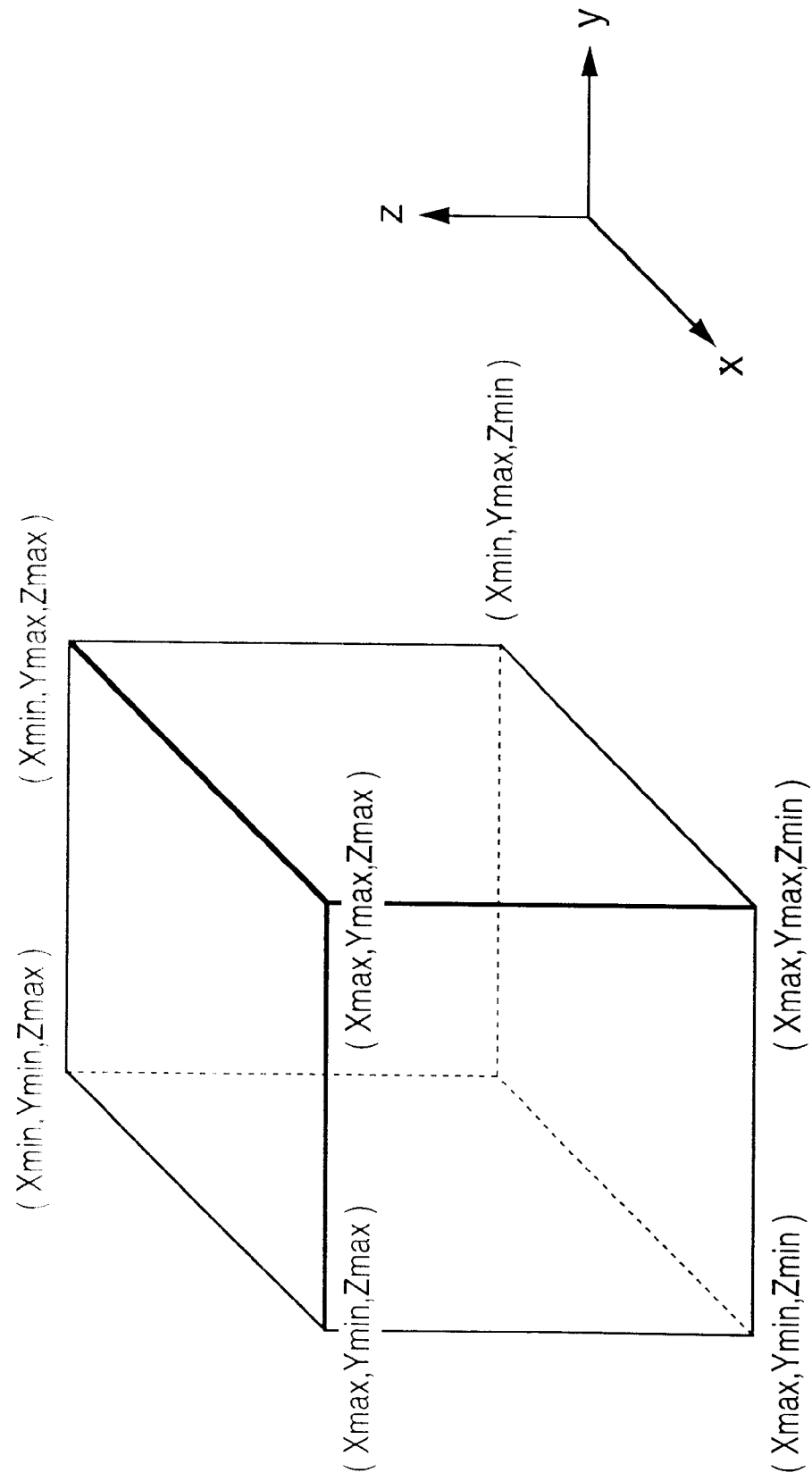
FIG. 13 is a view for explaining the principle of setting an initial value of the base line length.

More specifically, let ($X_i$, $Y_i$, $Z_i$) be a point group of VRML data. Among these points ($X_i$, $Y_i$, $Z_i$), the maximum values ($X_{max}$, $Y_{max}$, $Z_{max}$) and minimum values ($X_{min}$, $Y_{min}$, $Z_{min}$) of $X_i$, $Y_i$, and $Z_i$ are obtained. These maximum values ($X_{max}$, $Y_{max}$, $Z_{max}$) and minimum values ($X_{min}$, $Y_{min}$, $Z_{min}$) give one solid, as shown in FIG. 13. This solid defines the range of the target space expressed by the VRML data. Sizes S in the X-, Y-, and Z-directions of this solid are respectively given by:

$$S_X = X_{max} - X_{min}$$
$$S_Y = Y_{max} - Y_{min}$$
$$S_Z = Z_{max} - Z_{min} \qquad (2)$$

Hence, the base line length initial value $b_0$ is given by the maximum values of $S_X$, $S_Y$, and $S_Z$, i.e.:

$$b_0 = k \cdot \max(S_X, S_Y, S_Z) \qquad (3)$$

where k is a predetermined constant.

With this method, the user can perceive the target space expressed by the VRML data with a given size independently of the size expressed by the target space.

Since the size of the entire space does not always serve as a reference for the size of a human, desired stereoscopic sense may not always be obtained by the base line length determined as described above. For example, in order to display an object (e.g., pyramid) having a size with respect to a person, as shown in FIG. 14, the above-mentioned method presents it as an object having a size shown in FIG. 15 to the user when the size of a human is fixed at a given value, and the presented size does not always match the user's requirement. However, the base line length obtained by the above-mentioned method gives a field of view in which the entire target space can be seen. By contrast, it is possible for the present invention to set the base line length initial value $b_0$ at the size of a human eye, but such setup is often not preferable.

Since the constant value k can be arbitrarily set in equation (3) above, the scheme of the embodiment based on equation 93) allows to set the base line length initial value $b_0$ at the size of a human eye.

<Determination of Initial Value of Convergence Angle>

Of the processes executed in step S4, the initial value $\theta_0$ of the convergence angle is determined as follows.

The convergence angle $\theta$ is produced when both eyes point inwardly upon observing a close object. The convergence angle can be set when the depth of the space is limited and the range in the depth direction is narrow. However, under the assumption of observation to infinity, it is appropriate to set the convergence angle at "0", i.e., to set parallel viewing as an initial state. Hence, in this embodiment, the initial value of the convergence angle is set at:

$$\theta_0 = 0$$

The initial value=0 of the convergence angle does not always provide desired stereoscopic sense. However, a stereoscopic viewing parameter that can at least give stereoscopic sense can be set.

<User Interface>

The initial values of the stereoscopic viewing parameters do not give optimal values in every cases, as described above. Even when the initial values are optimal, it may be desirable to change these parameters as a result of walkthrough. For example, assume that the observer walks toward a given building in the virtual space of a street, and approaches the key hole in the door knob of one door in that building (then enters that key hole). In such case, since the right and left images cease to merge from a given timing (the deviation between the right and left images becomes too large), stereoscopic sense is lost. For this reason, the stereoscopic viewing parameters must be able to dynamically change in correspondence with observer's operation. In the aforementioned example, the base line length must be reduced (to reduce the size of a human to allow the observer to enter the key hole).

Furthermore, not only the stereoscopic viewing parameters but also interaction processing as a result of movement of the user in the virtual space is required.

The viewer application program 100 also provides a user interface for changing the parameters and inputting interactions.

Figure 16:
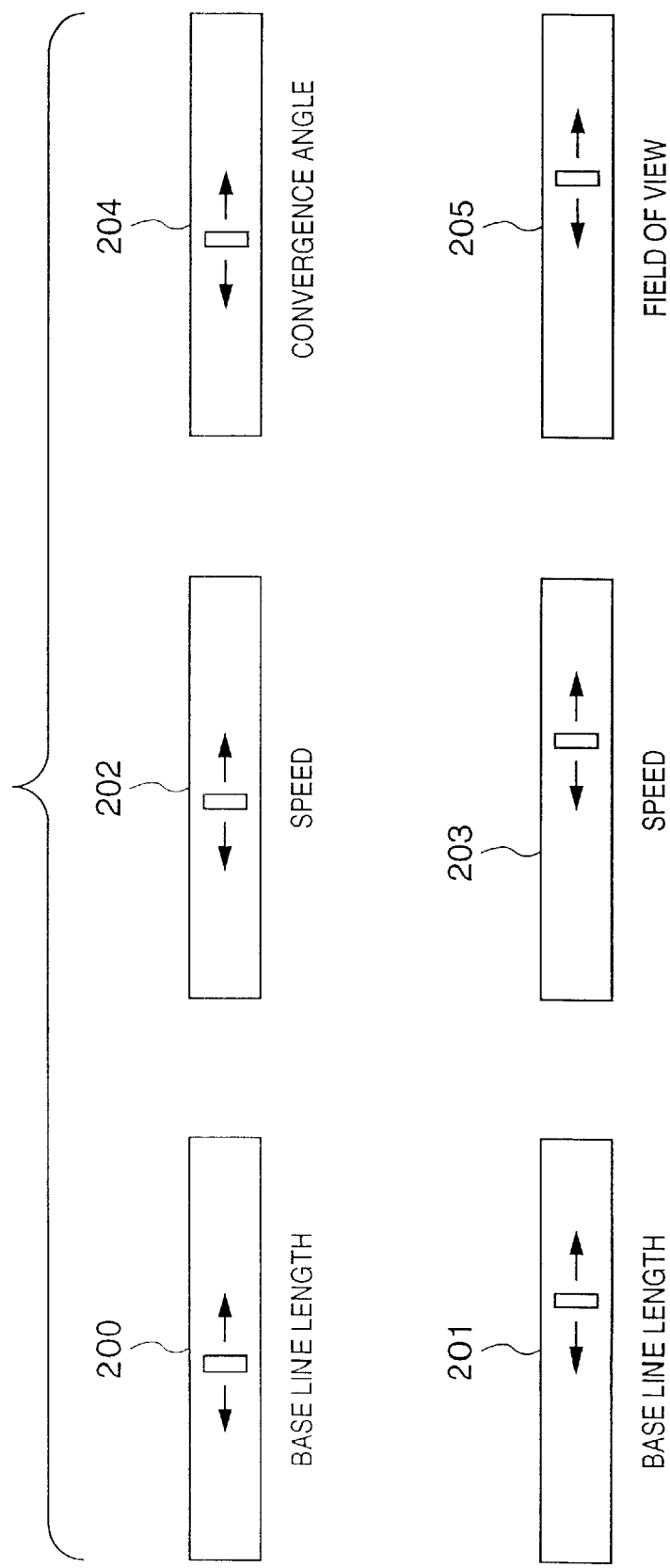
FIG. 16 is a view for explaining graphical user interfaces displayed on a display apparatus of an embodiment.

FIG. 16 shows a user interface (GUI) displayed on the screen of the display 10.

Referring to FIG. 16, reference numerals 200 and 201 denote user interface tools (BASE LINE LENGTH) for changing the base line length b, both of which are implemented by slide bars. The slide bar 200 is used for increasing the base line length, and the slide bar 201 is used for decreasing the base line length. When the base line length initial value $b_0$ is set to obtain the virtual space shown in FIG. 14, a display shown in FIG. 15 is obtained by increasing the base line length using the slide bar 200.

Referring to FIG. 16, slide bars 202, 203 are used for changing the forward speed and backward speed (SPEED), respectively. The slide bar 202 is used for effecting a large speed change, while the bar 203 is for effecting a small change.

A slide bar 204 is used for changing the convergence angle (View Convergence). Furthermore, a slide bar 205 is used for changing the field angle (Field of View).

The user interfaces shown in FIG. 1 are operated by the user using the mouse 15.

Note that the detailed tools of the user interface are not limited to slide bars. For example, tools that can continuously change parameters, e.g., graphical jog dials, and graphical wheels may be used.

<Image Synthesis>

Synthesis of the right and left images done in step S6 in FIG. 12 will be explained below.

Figure 17:
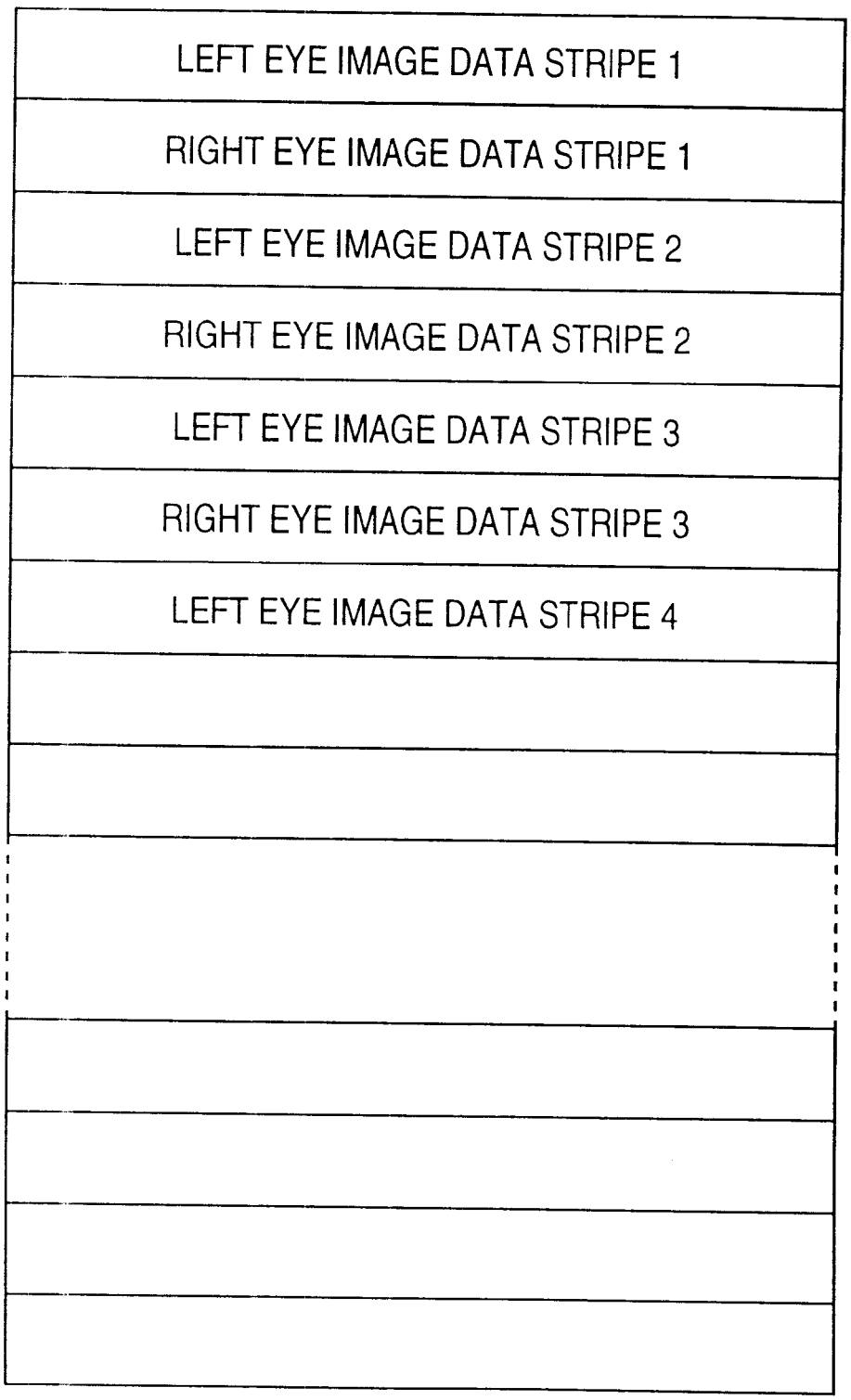
FIG. 17 is a table for explaining the order of data stored in a frame buffer of in the viewer apparatus of an embodiment.

The right and left eye images to be displayed on the display 10 to obtain stereoscopic viewing must be stored in a frame buffer. Since the stereoscopic display 10 used in this embodiment uses a rear-cross lenticular spectacle-less 3D display, pairs of right and left stereo images for stereoscopic viewing are alternately displayed in horizontal stripe patterns, as shown in FIG. 4. For this purpose, one frame buffer must alternately store one stripe for the left eye image and one stripe for the right eye image, as shown in FIG. 17.

Figure 18:
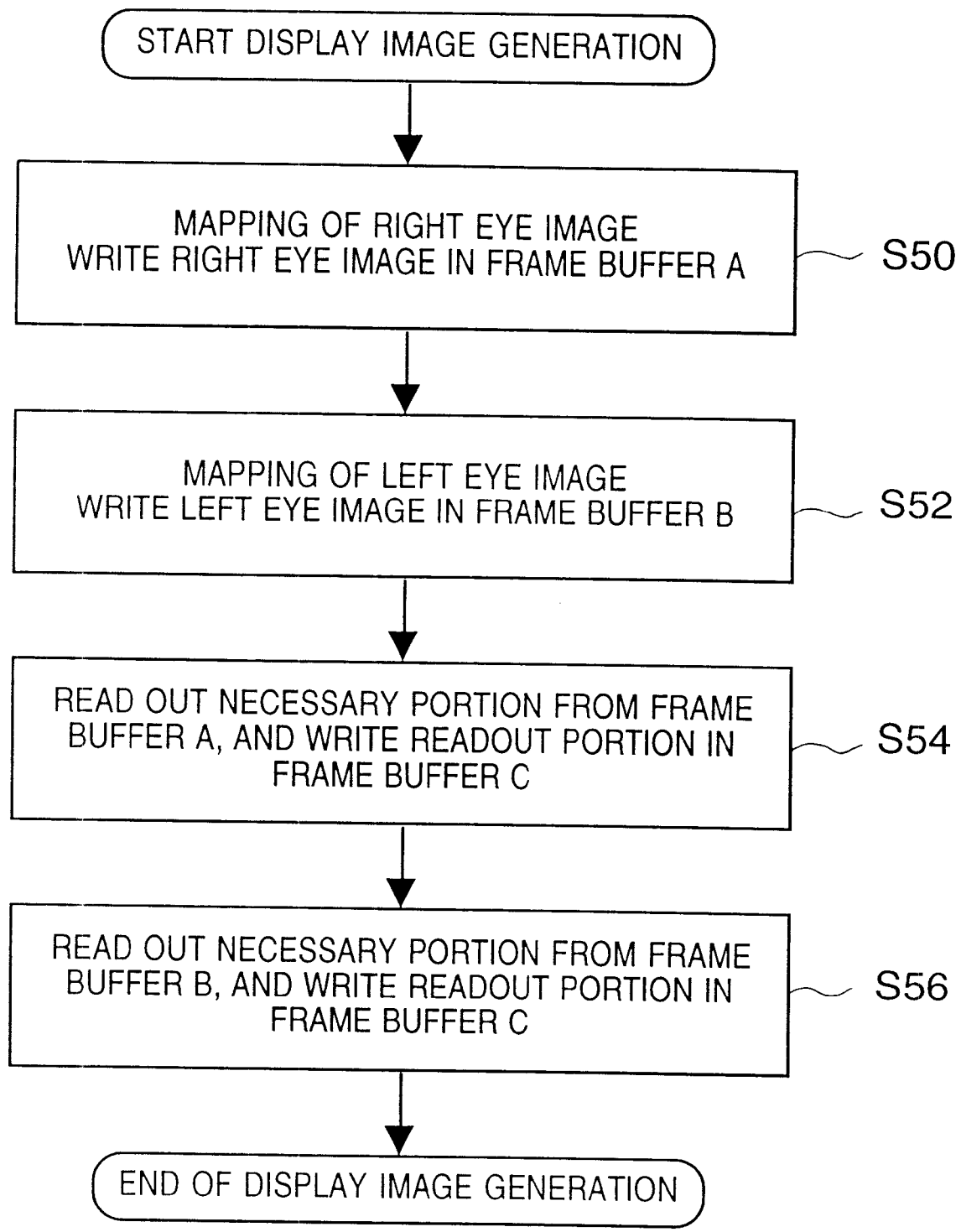
FIG. 18 is a flow chart for explaining the control sequence of frame buffers according to one conventional method.
Figure 19:
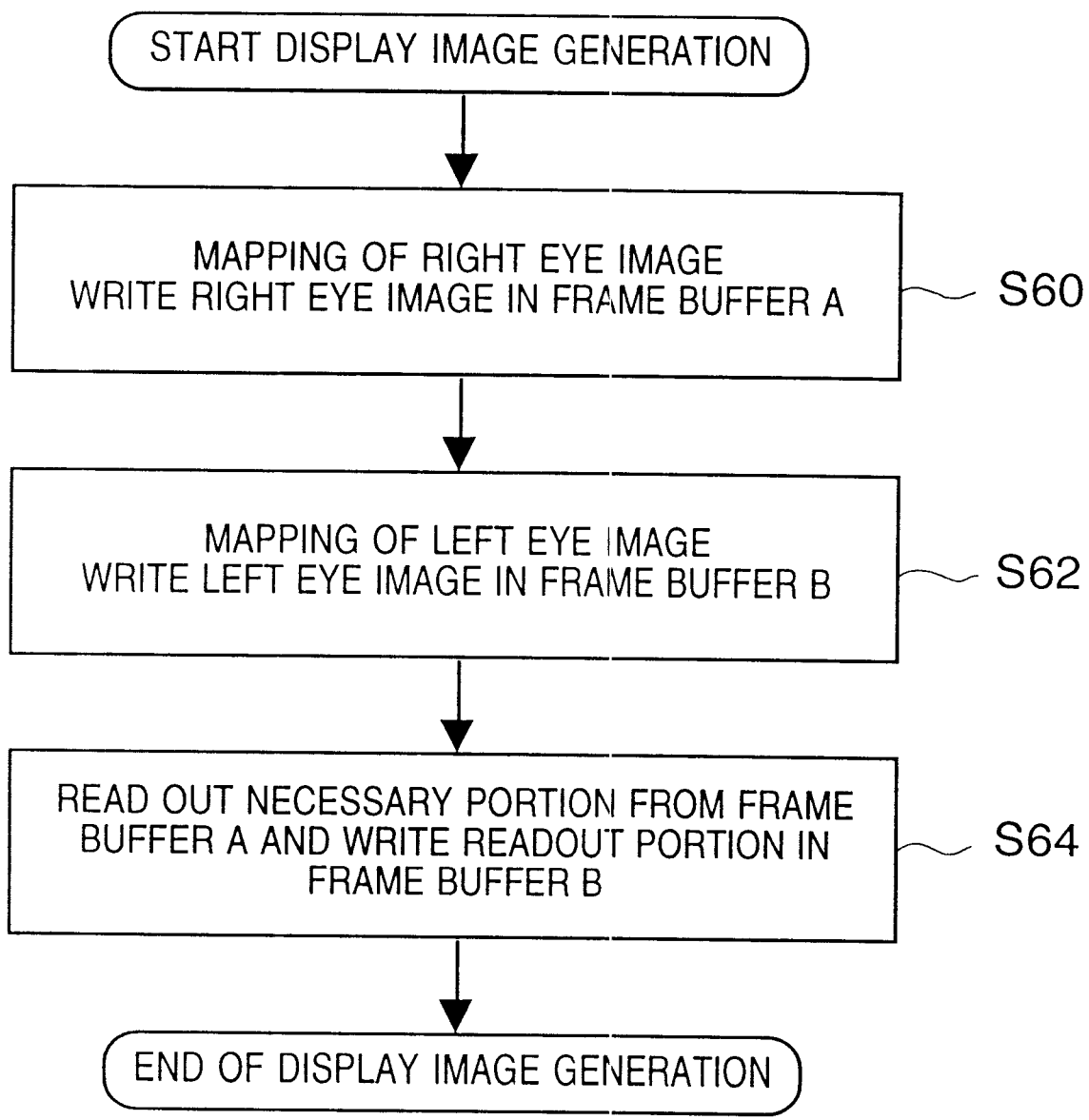
FIG. 19 is a flow chart for explaining the control sequence of frame buffers according to another conventional method.

Conventionally, as has been described previously with reference to FIGS. 18 and 19, since a plurality of frame buffers are required, a cost reduction cannot be attained, and a data read from the frame buffers lowers the processing efficiency.

However, the buffer control of this embodiment requires only one frame buffer, and can obviate the need for reading out data from the frame buffer. For this purpose, the viewer apparatus 1000 of this embodiment comprises the frame buffer 11 and stencil buffer 12.

The stencil buffer 12 is a buffer memory which is equipped as an option in some image processing apparatuses. In this embodiment, the stencil buffer 12, which is a part of a frame buffer, is a memory having a 1-bit depth, and the same numbers of bits as those of the display 10 in the horizontal and vertical directions. In this embodiment, the stencil buffer 12 is used as a mask, as shown in FIG. 20. More specifically, bits "1" serve as a mask, and bits "0" do not serve as a mask. Thus, the stencil buffer functions as a mask that masks a horizontal line every two lines.

Figure 21:
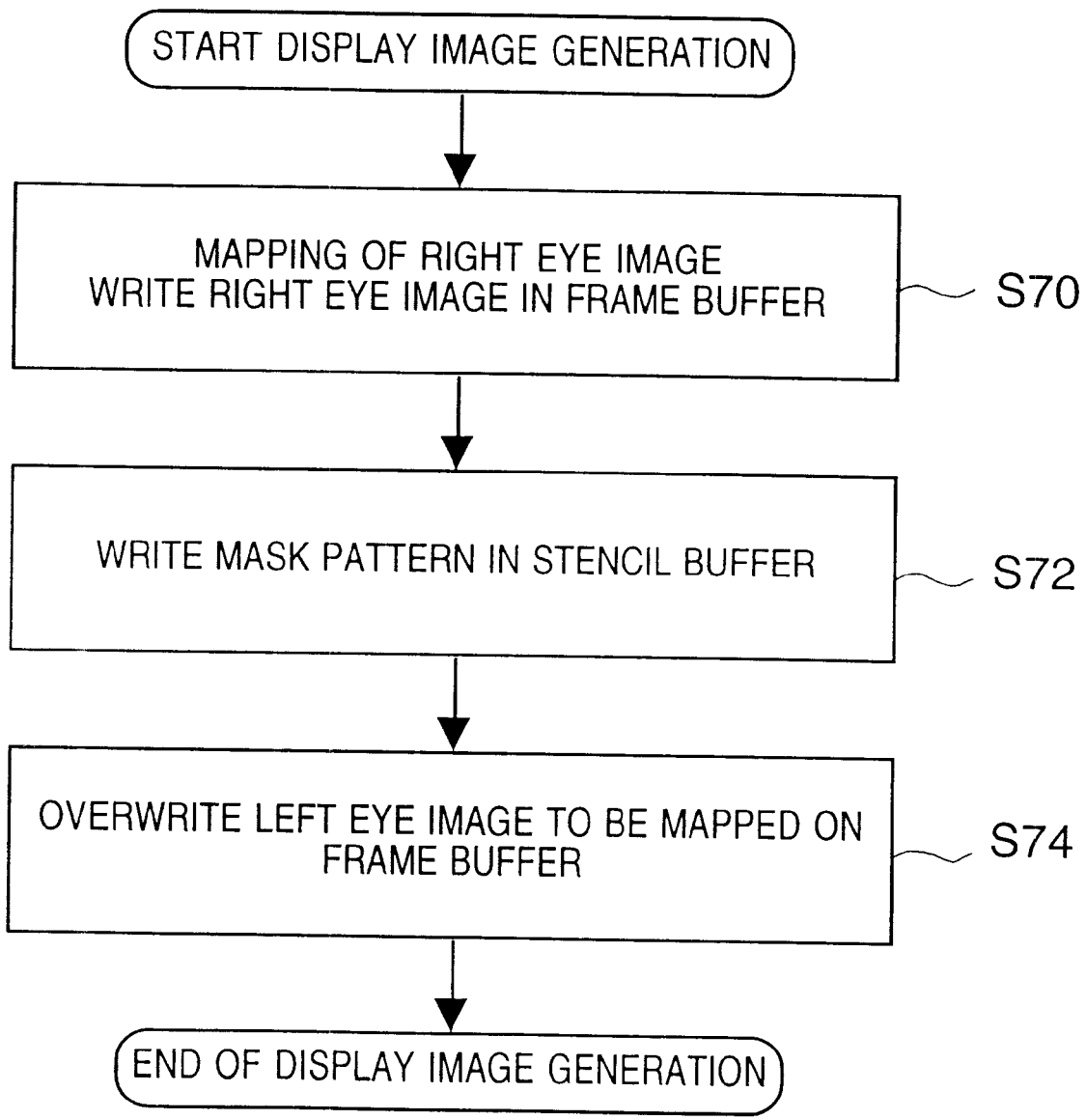
FIG. 21 is a flow chart for explaining the control sequence of frame buffer control according to an embodiment.
Figure 22:
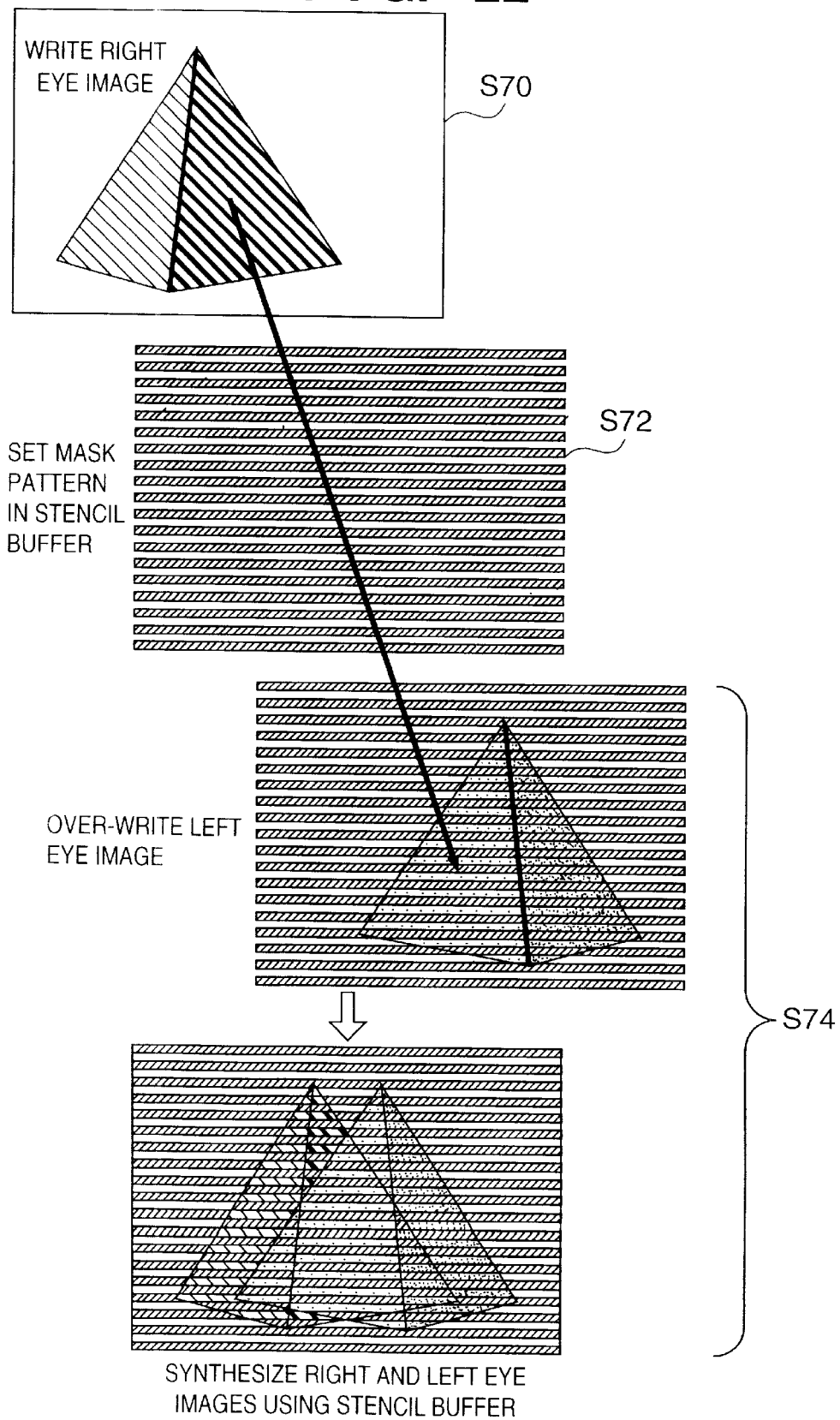
FIG. 22 is a view for explaining the control sequence of frame buffer control according to an embodiment.

FIG. 21 is a flow chart showing the data write sequence in the frame buffer.

In step S70, an image obtained when the three-dimensional space is viewed by the right eye is generated. Then, three-dimensional space data is rendered on the basis of the viewpoint position and direction of the right eye. In this manner, the right eye image as a rendering result is stored in the frame buffer 11. More specifically, at this time, data of the right eye image is written at all the addresses of the frame buffer 11.

In step S72, a mask pattern shown in FIG. 20 is prepared, and is written in the stencil buffer 12. Instead of using a masking pattern for each image as set forth above, lines may be drawn into the stencil buffer so that they form a masking pattern as shown in FIG. 20.

In step S74, a left eye image is generated, and is overwritten in the frame buffer. With the processing in step S74, the stencil buffer 12 functions so that the right eye image remains stored at those pixel positions in the frame buffer 11 which correspond to "0" positions in the stencil buffer 12, and the left eye image is written at those pixel positions in the frame buffer 11 which correspond to "1" positions in the stencil buffer 12. With this operation, stripes shown in FIG. 17 are obtained.

Data transfer that requires processing for reading out data from a frame buffer, and writing the data in another frame buffer is time-consuming processing, and lowers the processing speed. However, the scheme proposed in FIG. 21 synthesizes the right and left images by only overwriting masked data on the single frame buffer to update mapped data, without reading out data from the frame buffer, thus suppressing any processing speed drop. Since only one frame buffer is required like in normal processing for generating an image from a three-dimensional space, a cost reduction can be achieved.

<Advantages of Embodiment>

According to the stereoscopic image display apparatus described above, the following effects are expected.

i) For example, the base line length, convergence angle, and the like are mandatory in stereoscopic viewing but are not normally prepared in three-dimensional space data. However, according to the viewer application program of this embodiment, when three-dimensional space data is acquired from an external source (especially via the Internet or the like), such stereoscopic viewing parameters can be automatically added without the intervention of the user. The automatic addition of the stereoscopic viewing parameters is particularly effective when the viewer application program of this embodiment is implemented as a helper application program of such browsers as cannot limit objective data and therefore have to handle various data. In this case, the viewer application program can determine based on a file extension of data whether or not three-dimensional space data requires addition of parameters. Hence, parameters can be automatically added, and such determination can be made reliably.

ii) Since the user interface (GUI) that can freely change the set stereoscopic viewing parameters in correspondence with the user's purpose is prepared, natural stereoscopic viewing can be achieved in accordance with the application purpose.

Since the user interface is a graphical user interface (GUI), it has high operability.

iii) According to the buffer control of this embodiment, the number of frame buffers can be reduced to one since only a low-cost stencil buffer is used to render a stereoscopic image. Since the need for reading out data from the frame buffer can be obviated, effective mapping onto the buffer can be done.

<Modifications>

The viewer application program of the present invention is not limited to the helper application program of the WWW browsers. It may be implemented as a plug-in program in the browsers, and it can also serve as a standalone program as long as a stereoscopic image is to be displayed.

The initial values of the stereoscopic viewing parameters can also be determined by schemes other than the aforementioned schemes. Whether or not the determined initial values of the parameters make the user feel incoherent depends on applications. Hence, various constant values k for determining initial values may be prepared in advance in the viewer application program in units of application programs, and different constant values may be used in correspondence with application programs.

The user interface of the present invention need not always be displayed on the display, and any other user interfaces may be used as long as the user can change parameters and the like continuously or discretely.

The mask functions assigned to bits "0" and "1" of the mask information may be reversed. Also, bits "0" and "1" may be stored in correspondence with the layout order of the image format in the LCD 20 of the stereoscopic display 10.

In the control sequence shown in FIG. 21, the left eye image may be written first. Whether or not mask functions assigned to bits "0" and "1" of the mask information are reversed may be determined in correspondence with the layout of the LCD 20 of the stereoscopic display 10.

To restate, according to the present invention, parameters can be assigned to three-dimensional space data in which no stereoscopic viewing parameters are defined.

Also, the user interface apparatus that can freely change stereoscopic viewing parameters can be provided.

Furthermore, buffer control for efficient stereoscopic viewing display can be realized using only one frame buffer.

As many apparently widely different embodiments of the present invention can be made without departing from the spirit and scope thereof, it is to be understood that the invention is not limited to the specific embodiments thereof except as defined in the appended claims.

What is claimed is:

1. A stereoscopic image processing apparatus comprising:
   receiving means for receiving three-dimensional space data;
   storing means for storing the three-dimensional space data received by said receiving means;
   generating means for generating a parameter required for performing a stereoscopic viewing on the basis of the three-dimensional space data received by said receiving means; and
   determination means for determining necessity of generation of the parameter on the basis of a file extension of the three-dimensional space data received by said receiving means.

2. The apparatus according to claim 1, wherein the parameter defines a base line length of a user.

3. The apparatus according to claim 1, wherein the parameter defines a convergence angle of a user.

4. The apparatus according to claim 2, wherein the parameter defines a convergence angle of a user.

5. The apparatus according to claim 1, further comprising:
   user setting means for allowing a user to set a value of a stereoscopic viewing parameter; and
   means for changing a value of the stereoscopic viewing parameter in accordance with the set value.

6. The apparatus according to claim 5, further comprising display means, and wherein said user setting means displays a GUI on said display means.

7. The apparatus according to claim 6, wherein said GUI is implemented by a slide bar, jog dial or wheel.

8. The apparatus according to claim 5, wherein the stereoscopic viewing parameter defines a base line length of the user.

9. The apparatus according to claim 6, wherein the stereoscopic viewing parameter defines a base line length of the user.

10. The apparatus according to claim 5, wherein the stereoscopic viewing parameter defines a convergence angle of the user.

11. The apparatus according to claim 6, wherein the stereoscopic viewing parameter defines a convergence angle of the user.

12. A program storage medium for a computer program storing:
   a receiving step program of receiving and storing three-dimensional space data;
   a storing step program of storing the three-dimensional space data receiving by said receiving step program;
   a generating step program of generating a parameter required for preforming stereoscopic viewing on the basis of the received three-dimensional space data receiving by said receiving step program; and
   a determination step program of determining necessity of generation of the parameter on the basis of a file extension of the three-dimensional space data received by said receiving step program.

13. A program storage medium for a computer program storing:
   a step program of receiving and storing three-dimensional space data;
   a step program of determining necessity of generation of a parameter on the basis of a file extension of the received three-dimensional space data; and
   a step program of generating a parameter required for stereoscopic viewing on the basis of the received three-dimensional space data if it is determined that the parameter must be generated.

14. The apparatus according to claim 1, wherein parameters that include a base line length, and an initial value of the base line length is estimated from the size of the entire space which is said generating means generates plural estimated from the three-dimensional space data.

* * * * *